Oct. 12, 1965        E. J. McELREATH        3,211,903
ILLUMINATED MIRROR
Filed July 29, 1963
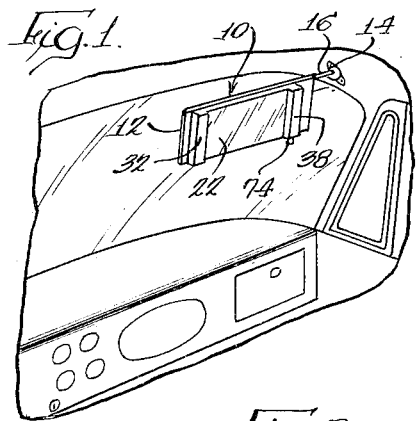
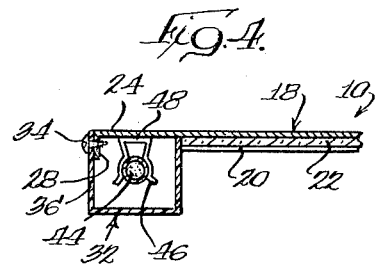
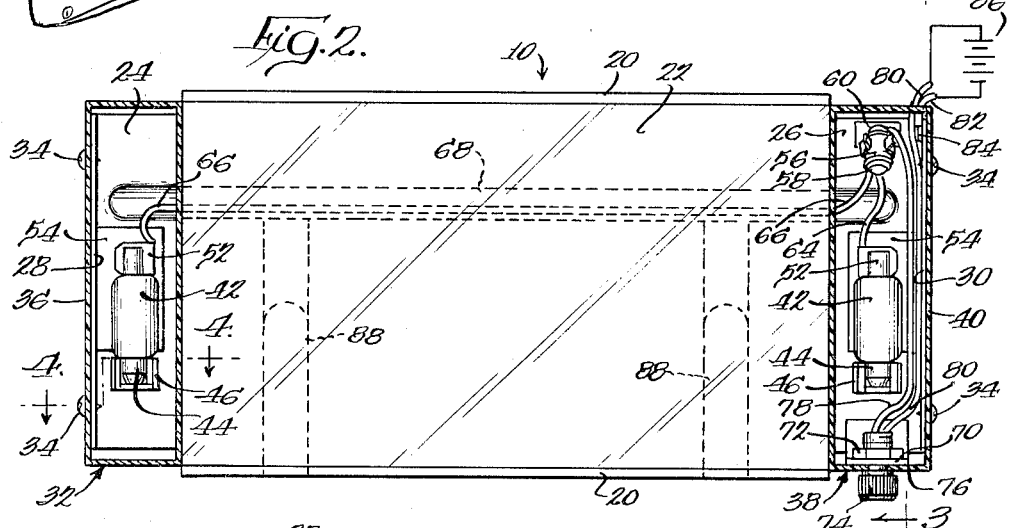
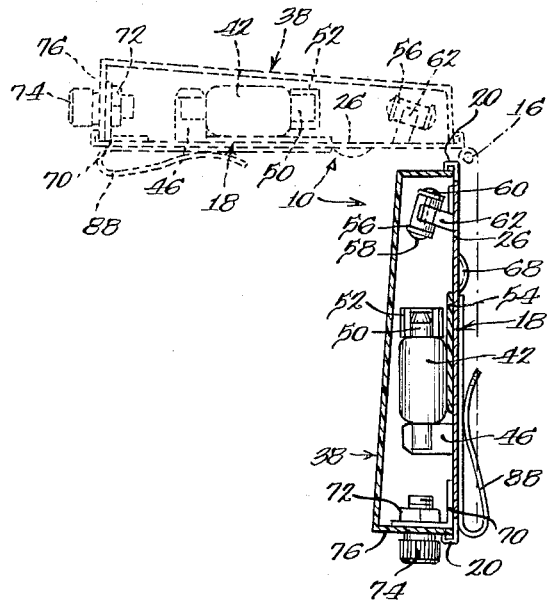
INVENTOR.
Elmer J. McElreath
BY
B. Gordon Aller
Atty

3,211,903
ILLUMINATED MIRROR
Elmer J. McElreath, 1 N 743 Forest Ave., Glen Ellyn, Ill.
Filed July 29, 1963, Ser. No. 298,217
2 Claims. (Cl. 240—4.2)

The present invention relates to improvements in illuminated mirrors adapted to be secured to the conventional pivotally mounted sun visor in an automobile.

A principal object is to provide a new and improved illuminated mirror for mounting on the sun visor of an automobile, which is simple in construction, economical to manufacture, and easy to maintain and keep clean.

Another object is to provide a new and improved illuminated mirror for automobiles which is easily clipped to the sun visor and arranged automatically to be illuminated when the visor is in the turned-down position.

Another object is to provide a new and improved illuminated mirror which is automatically illuminated when the visor is in the turned-down position, but which incorporates a manual overcontrol for the illumination.

Another object is to provide a new and improved illuminated mirror for mounting on the conventional sun visor of an automobile which includes a position oriented mercury switch in the electric circuit thereof which operates to illuminate the mirror and the person using it when the mirror is in the down or sun shading position.

Another object is to provide a new and improved illuminated mirror for an automobile, so arranged that it incorporates a pair of lamp housings at opposite ends of the mirror without glare in the face of the user or onto the surface of the mirror.

Other objects and advantages will become apparent from the following description taken in conjunction with the accompanying drawing wherein:

FIG. 1 is a partial perspective view of the interior of an automobile showing the illuminated mirror of the present invention secured to a sun visor which is shown in turned-down position;

FIG. 2 is a face view of the illuminated mirror of the present invention, with the lamp housings at either end broken away to illustrate the mounting of the lamps therein;

FIG. 3 is a transverse sectional view taken along the line 3—3 of FIG. 2, looking in the direction of the arrows showing the illuminated mirror in the "off" position in dotted lines; and FIG. 4 is a fragmentary sectional view through one lamp housing taken along the line 4—4 of FIG. 2, looking in the direction of the arrows and showing the mounting of the lamp therein.

The illuminated mirror 10 of the present invention is adapted to be removably secured to a pivotally mounted sun visor 12 of an automobile, which is mounted on a conventional bracket 14 and a pivot 16.

The illuminated mirror assembly includes a base plate 18 having channel shaped portions 20 along opposite upper and lower marginal edges (when the mirror is in the FIG. 1 position) to receive the opposite marginal edges of a mirror 22 fixedly to secure the mirror to the base plate 18.

The base plate 18 includes at opposite ends thereof portions 24 and 26 which extend beyond the ends of the mirror 22 and are somewhat narrower from top to bottom than the major portion of the base plate, as will be observed particularly from FIG. 2. The end portion 24 has a forwardly upstanding flange 28, and the end portion 26 has a similar upstanding flange 30. The flanges project forwardly or in the same direction as do the channel portions 20 and away from the body of the base plate 18.

A translucent plastic lamp housing 32 completely covers the end portion 24, encloses the upstanding flange 28, and is secured to the flange 28 by a pair of sheet metal screws 34 which extend through holes in side wall 36 of the lamp housing into suitable holes in the flange 28. It will be noted, particularly from FIG. 3, that the lamp housing 32 is shaped to stand somewhat farther from the end portion 24 at its lower end than at its upper end, thereby providing a pleasing appearance, and for another reason which will be shown hereinafter.

A second translucent lamp housing 38 encloses the end portion 26 and the flange 30 in a manner similar to the lamp housing 32. It is secured to the flange 30 by sheet metal screws 34 fastened through holes in housing side wall 40 and into suitable holes in the flange 30.

A double terminal lamp is enclosed in each of the lamp housings 32 and 38 and is held in position by each having its terminal 44 clipped into a U-shaped clip type lamp holder 46. As seen in FIG. 4, the base 48 of the holder 46 is soldered, welded, or otherwise similarly fixedly secured to the base plate 18 on the projecting end portion 24 thereof. The clip type lamp holder so engages the terminal 44 of the lamp 42 that it firmly holds the lamp in position within the lamp housing 32 or 38, respectively, and in a position generally parallel to and against the projecting portions 24 and 26 of the base plate 18. Thus, the lamps are firmly mounted for normal usage conditions.

Second terminal 50 of each lamp 42 is engaged by a similar clip type holder 52 which is not secured to the base plate extension 24 or 26 but is insulated therefrom by an insulating sheet 54 which may be glued to the base plate 18 and underlies the lamp 42.

Within the lamp housing 38, a mercury switch 56 of conventional construction having a pair of connecting terminals 58 and 60 is mounted on a bracket 62 in such position that the switch is open or "off" when the illuminated mirror 10 is horizontal, as shown in the dotted line position of FIG. 3, and closed or "on" when the mirror 10 is vertical as shown in full lines in FIG. 3, and as shown in FIG. 1. The terminal 58 of the mercury switch 56 is connected to the holder 52 in the lamp housing 38 by a conductor 64. This same terminal is connected to the holder 52 for the lamp 42 in the lamp housing 32 by a conductor 66 which extends through a depressed channel 68 in the base plate 18 behind the mirror 22.

Within the housing 38 and at the larger end thereof is an L-shaped bracket 70 which is welded, soldered or otherwise fixed to the projecting portion 26 of the base plate 18, and to which is mounted a conventional manually operable on-off switch 72 which has a control knob 74 projecting through an enlarged opening in end wall 76 of the housing 38 for convenient use by the person desiring to condition the electric circuit for illumination of the lamps 42 or to turn them off. The terminal 60 of the mercury switch 58 is connected by a conductor 78 to one terminal of the on-off switch 72, and the other terminal of the on-off switch is connected to a conductor 80 which leads outwardly from the lamp housing 38 at the upper end thereof. A conductor 82 is soldered at 84 to the base plate 18 adjacent the flange 30 and leads outwardly of the lamp housing 38. The conductors 80 and 82 are suitably connected into the electric circuit of the automobile which includes battery 86, and if desired, this connection may be made through the ignition lock of the automobile so that when the ignition is turned off the circuit to the lamps 42 will be deenergized and they will not burn without reason to run down the car battery if the assembly 10 should be in such condition that the lamps 42 normally would be illuminated.

A pair of relatively large spring clips 88 is secured by soldering or welding to the rear face of the base plate 18 and they are adapted to embrace the body of the sun visor 12 so as to secure the illuminated mirror assembly 10 to the visor in the manner shown in FIG. 1.

In conditions of normal use, the switch 72 will be in the "on" position. When the sun visor is turned up or out of the way, the lamps 42 are not energized since the mercury switch 56 is in the "off" position. However, when the sun visor is turned down, the lamps 42 immediately go on and illuminate the mirror 22 and the face of the user. Should it be desired that the sun visor 12 be turned down under driving conditions for shading purposes and where the illumination is not desired, then the knob 74 of the switch 72 is utilized to turn the lamps 42 off.

From the foregoing description, it will be obvious that the advantages which have been claimed for this invention at the outset of this specification are readily attained by this structure, it being noted that the structure is simple, incorporates, an automatically operating mercury switch, has few parts many of which are identical, is economical to manufacture, and is easy to keep clean.

While a preferred embodiment of the new and improved illuminated mirror constituting the present invention has been shown and described, it will be apparent that numerous modifications and variations may be made therein without departing from the underlying principles of the invention. It is, therefore, intended by the following claims to include all such variations and modifications by which substantially the results of this invention may be obtained through the use of the same or equivalent means.

What is claimed as new and desired to be secured by United States Letters Patent is:

1. An illuminated mirror for attachment to a pivotally mounted sun visor in an automobile, comprising in combination, a base plate having inturned U-shaped channel portions along its upper and lower edges, a mirror secured against one face of said base plate by means of having its opposite marginal edges retained by said channel portions, said mirror extending longitudinally the major portion of the length of said base plate, said base plate having upturned flanges at its opposite ends and spaced from the adjacent mirror ends, a transluscent lamp housing removably secured to each flange and covering those portions of said base plate projecting beyond the ends of said mirror, a first clip type lamp holder in each lamp housing soldered to said base plate, a second clip type lamp holder in each lamp housing insulated from said base plate, a double ended lamp removably secured to said holders in each lamp housing, a position sensitive mercury switch in one lamp housing, a manually operable on-off switch in said last mentioned lamp housing, an electric circuit adapted to be connected to the battery of an automobile and including conductors connecting said lamps in parallel and to said switches, the latter being connected in series, and mounting clips secured to the face of said base plate opposite the face covered by said mirror and adapted to hold the aforesaid assembly to the sun visor in an automobile.

2. An illuminated mirror for attachment to a pivotally mounted sun visor in an automobile, comprising in combination, a base plate having inturned U-shaped channel portions along its upper and lower edges, a mirror secured against one face of said base plate by means of having its opposite marginal edges retained by said channel portions, said mirror extending longitudinally the major portion of the length of said base plate, said base plate having upturned flanges at its opposite ends and spaced from the adjacent mirror ends, a transluscent lamp housing removably secured to each flange and covering those portions of said base plate projecting beyond the ends of said mirror, a first clip type lamp holder in each lamp housing soldered to said base plate, a second clip type lamp holder in each lamp housing insulated from said base plate, a double ended lamp removably secured to said holders in each lamp housing, a position sensitive mercury switch in one lamp housing, a manually operable on-off switch in said last mentioned lamp housing, conductors connecting one terminal of said mercury switch to said second clip type lamp holders, a conductor connecting the other terminal of said mercury switch to one terminal of said on-off switch, a conductor connected to the other terminal of said on-off switch and adapted to be connected to a source of power, a conductor secured to said base plate and adapted to be connected to a source of power, and mounting clips secured to the face of said base plate opposite the face covered by said mirror and adapted to hold the aforesaid assembly to the sun visor in an automobile.

References Cited by the Examiner

UNITED STATES PATENTS

| | | | |
|---|---|---|---|
| 2,123,319 | 7/38 | Thompson | 240—4.2 |
| 2,493,192 | 1/50 | Grey | 240—9.5 |
| 2,640,909 | 6/53 | Montgomery | 240—4.2 |
| 2,932,726 | 4/60 | Hunter | 240—25 |

NORTON ANSHER, *Primary Examiner.*